Aug. 30, 1927.
C. J. MAHERAS
1,640,786
AGRICULTURAL CULTIVATOR AND WEED CUTTER
Filed Oct. 13, 1924          2 Sheets-Sheet 1
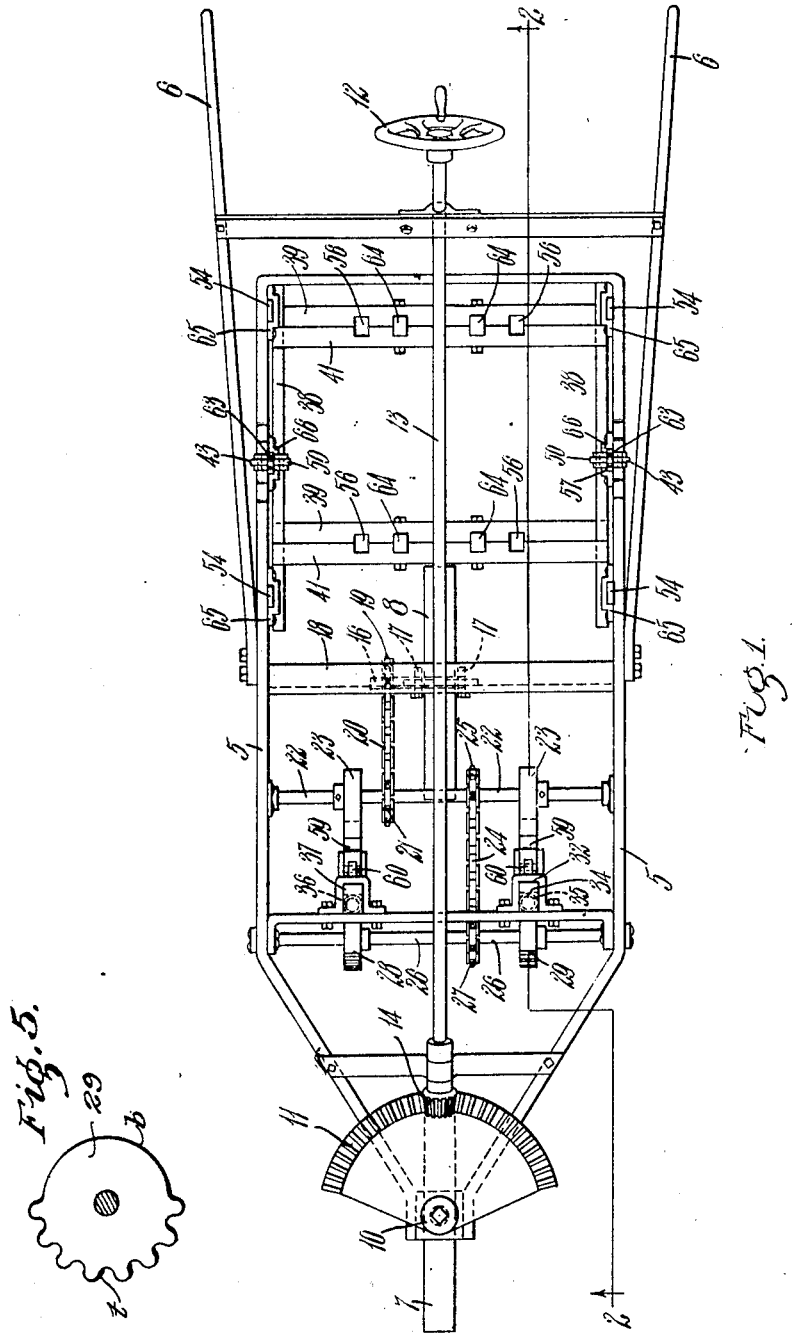

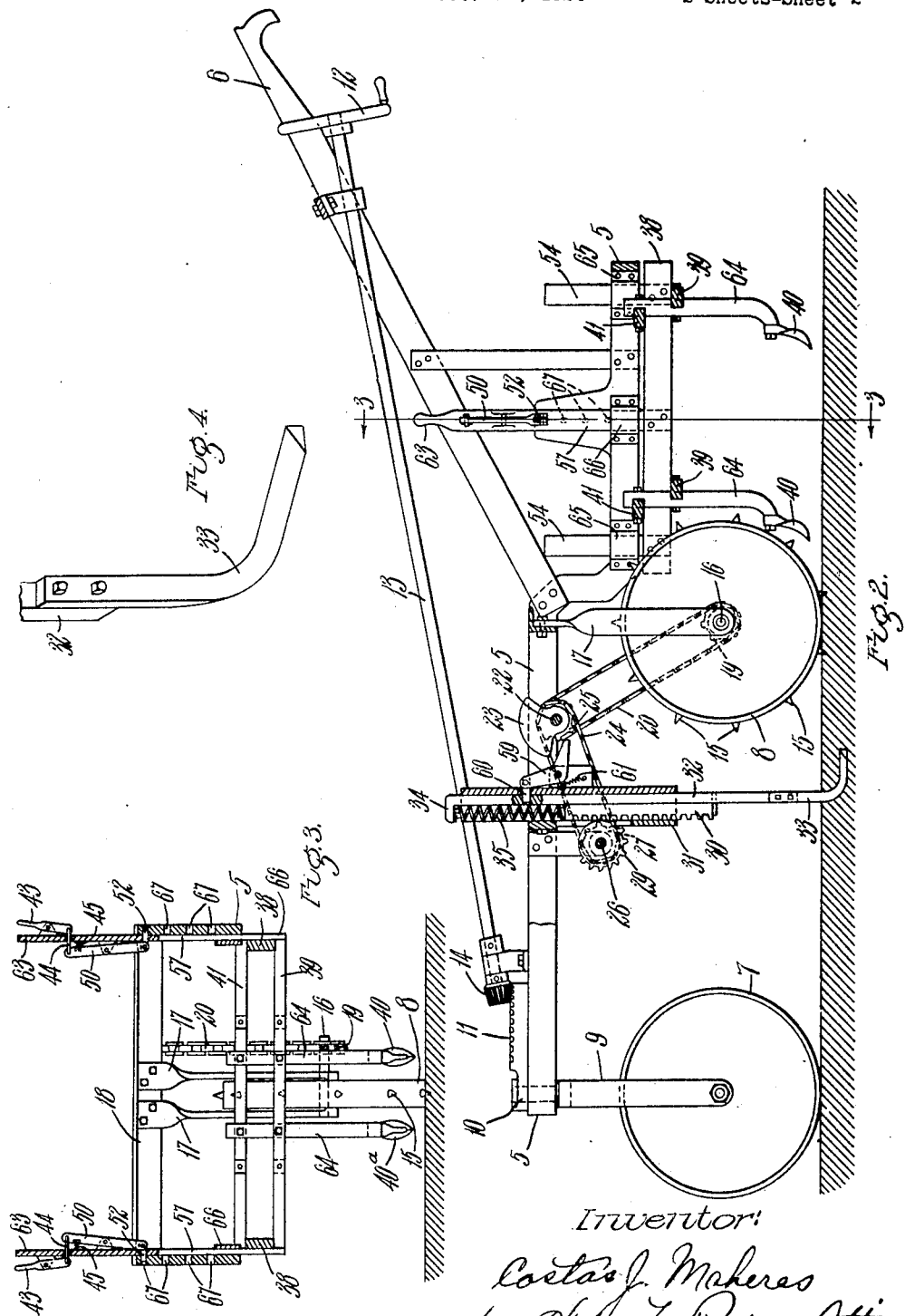

Patented Aug. 30, 1927.

1,640,786

UNITED STATES PATENT OFFICE.

COSTAS J. MAHERAS, OF BOSTON, MASSACHUSETTS.

AGRICULTURAL CULTIVATOR AND WEED CUTTER.

Application filed October 13, 1924. Serial No. 743,193.

My invention consists of an improved agricultural cultivator and weed cutter.

The objects of my invention are to provide means for cutting down at intervals young vegetable plants growing in the field, simultaneously cutting the weeds between the rows of plants and turning the weeds and cut plants into the ground.

In the accompanying drawing illustrating my invention Fig. 1 is a plan view of a machine embodying my invention; Fig. 2 is a vertical section of the machine through the line 2—2 in Fig. 1; Fig. 3 is a vertical section of the machine through the line 3—3 in Fig. 2 looking in the direction of the arrow; Fig. 4 is an enlarged view of the knife shown in the other figures of the drawing; and Fig. 5 is an enlarged view of one of the pinions shown in Figs. 1 and 2.

Similar numerals indicate the corresponding parts in all the figures of the drawing.

5 is the frame of the machine, 6, 6, the handles by which it is guided by the operator; 7 is the front wheel, and 8 is the rear wheel on which the machine runs. The front wheel 7 is supported and journaled in the fork 9, which is pivoted in the frame of the machine and keyed in the hub 10, of the segment gear 11.

The front wheel 7 is guided by the steering wheel 12, shaft 13, and pinion 14 fast on the shaft 13 and meshing with the segment gear 11. The periphery of the rear wheel 8 is provided with prongs 15,—having the length and sharpness required to grip the ground in a given soil, sufficiently to overcome the friction of the knives and other implements carried by the machine.

The axle 16 of the rear wheel 8 is supported on the hangers 17 secured to the transverse piece 18 of the frame of the machine. Secured to the axle 16, is a sprocket wheel 19 which drives a sprocket chain 20 which in turn drives the sprocket 21, fast on the shaft 22. Secured to the shaft 22, are the cams 23, 23. The sprocket chain 24, driven by a sprocket 25, drives the shaft 26 through the sprocket 27. Pinions 28 and 29 are loosely mounted on the shaft 26, and have cogs only on a part of the periphery as shown.

The pinion 29 engages a rack 30, mounted in a vertical sleeve 31, which also contains the sliding shaft 32,—the rack 30 and shaft 32 being in sliding contact with each other. Secured to the lower end of the shaft 32 is a knife 33, shown enlarged in Fig. 4, and adapted to cut the tender plants of lettuce and similar vegetable growths. The upper end of the shaft 32 is provided with a flange 34. Between the flange 34, of the shaft 32, and the top of the rack 30, a helical spring 35 is confined and serves to raise the shaft 32 and lift the knife 33 from the ground at the required time, as hereinafter described.

The combination of the rack 30, shaft 32 with its knife 33, and helical spring 35 is duplicated in connection with the pinion 28 on the opposite side of the machine, 37 indicating the duplicate shaft, and 36 the duplicate helical spring.

While I have shown the shaft 32 and the rack 30 mounted in a perpendicular sleeve 31, it is evident that the direction of the sleeve and consequently of the shaft and rack need not necessarily be exactly perpendicular so long as the shaft is thrust upwardly and downwardly to and from the ground, and the words "vertical" and "vertically" with respect to the sleeve and shaft are to be understood as meaning an upright position as distinguished from a horizontal one.

Mounted within the frame 5, is a cast metal supplemental frame composed of the longitudinal members 38, 38 and the cross pieces 39, 39 and 41, 41. Bolted to the cross pieces 39 and 41 are the vertical shafts 64, 64, carrying a harrow or other agricultural implement 40, that may be desired to use in connection with the other implements of the machine. In this instance I have shown a harrow for the purpose of turning the weeds and cut plants into the ground. Bolted to the longitudinal members 38 of the supplemental frame are the upright guides 54, 54, arranged to slide in the brackets 65. Also bolted to the longitudinal members 38, is the upright member 57 sliding in the guide bracket 66 in the frame of the machine. The upper end of the upright member 57 is provide with a handle 63. The upright member 57 is duplicated on the opposite side of the machine. Mounted on the outside of each handle 63 is a lever 43, connected by the link 44 with the lever 50 provided with a latch 52 on the inside of the handle which serves to lock the supplemental frame at a desired height. The latch 52 and holes 67, 67 provide means for varying the height of the frame and the distance of the harrow 40 in the ground.

The chief object of my invention is to provide means for cutting down at intervals the rows of tender vegetable plants, for instance, lettuce, leaving the uncut plants standing at uniform distances apart in the rows, and to cut down the weeds that have grown in the rows with the plants. It is one of the objects also at the same time to cut the weeds between the rows and turn them into the ground.

In the operation of the machine, the knives 33 are set at a distance apart equal to the distance between the rows of plants, and the harrow 40 or other implements employed in their place are set so as to enter the ground between the rows of plants, and thereby remove the weeds and turn the weeds and plants into the soil.

It is, of course, obvious that a motor could be employed to drive the machine, but, as shown, it is designed to be driven by hand.

The engagement in the ground of the prongs 15 of the rear wheel 8 is sufficient to overcome the friction of the knives 33, and the other implements employed. The pinions 28 and 29, driven by the sprocket 19 and the intermediate sprockets and sprocket chains, engage the rack 30 and its duplicate and raise them so as to compress the springs 35 and 36, while the shafts 32 and 37 are held fastened by the latch 60 and its duplicate.

As clearly shown in Figure 2, the pinion 29 is so constructed that a part of its periphery is provided with cogs or teeth $t$, and the rest of the periphery is blank, i. e. toothless as indicated at $b$. The same is true of the pinion 28. During rotation of the pinions their teeth mesh with the teeth of the respective racks 30 and cause said racks to travel upwardly, thereby compressing the springs 35 and 36, and applying a lifting tension to the shafts 32 and 37. Upward movement of the shafts however, is prevented by engagement of the pins 60 therewith. The parts are so timed that just before blank portions $b$ of the pinions come in contact with the racks and while the teeth of said pinions are engaged with the racks, the cams 23 will act to disengage the pins 60 from said shafts so that the blades will be raised by the action of said springs. The machine is then advancing with the knives 33 raised from the ground, thereby leaving certain of the plants uncut. Just as soon however, as the blank portions $b$ of the pinions come into engagement with the racks 30, the blades and the racks associated with them will drop by gravity into operative position and will remain in their lowered positions until the teeth of the pinions again engage the teeth of the racks. In the meantime the pins 60 have reengaged the shafts and the previously described operation is repeated.

This operation, in the onward movement of the machine, of raising the knife from the ground and dropping it into the ground, takes place at intervals, leaving the plants uncut at any desired distance apart, and cutting the weeds and plants in between.

The harrow 40 or other implements employed for cultivating, are raised and lowered by the operator at will by the handles 63, and are locked in position when in the ground by means of the latch 52, and are released so as to be raised from the ground by the operator by means of the levers 43 and 50. When the frame carrying the harrow 40 is lowered and set in the ground the operator releases the lever 43, and the spring 45 throws the latch 52 into one of the openings 67.

The distance between the harrows 40 and 40$^a$ may be varied by bolting them to the cross pieces 39 and 41 at different points, such as shown at the recesses 56, 56.

The knives 33 are made of such length as required to cut the weeds between the rows of plants as well as the plants, and are to be secured to the shaft 32 at any angle desired by the operator, with a view of delivering the weeds and cut plants as much as practicable into the path of the harrows or cultivators 40.

By the use of this machine the hand work now necessitated in cutting the plants, weeding and cultivating about them is avoided and accomplished with great rapidity and economy.

What I claim and desire to secure by Letters Patent is:

1. In combination with a wheeled frame, a vertically slidable shaft carrying a cutter, means for locking said shaft in lowered position, a member slidable vertically with relation to the frame and the shaft, a compression spring between said member and shaft, and means driven from a ground wheel for lifting said member and then releasing the locking means.

2. The combination with a wheeled frame, of a vertically movable shaft carrying a cutter, a vertically slidable lifting member, means by which said member is raised periodically, means operated by the raising of said member for imparting a lifting tension upon said shaft, means for causing said shaft to resist said lifting tension, and means for periodically releasing said shaft from said tension resisting means.

3. In a machine of the character described, a carriage having a vertical sleeve mounted thereon combined with a vertically slidable shaft carrying a cutter contained in said sleeve, a member consisting of a rack contained in said sleeve and slidable vertically with relation to said shaft, a compression spring between said member and said shaft, and means for lifting said member and releasing said shaft.

4. The combination with a wheeled frame, of a vertically movable shaft carrying a cutter, a vertically slidable lifting member yieldably engaging said shaft so that a lifting tension is imparted to said shaft when said lifting member is raised, means by which said member is raised periodically to impart a lifting tension upon said shaft, means for causing said shaft to resist said lifting tension, and means for periodically releasing said shaft from said tension resisting means.

5. The combination with a wheeled frame, of a vertically movable shaft carrying a cutter, a vertically slidable lifting member, means by which said member is raised periodically, means operated by the raising of said member for imparting a lifting tension upon said shaft, means for normally preventing movement of said shaft during a portion of the time that the lifting tension is being applied, and means for periodically releasing said shaft from said movement-preventing means.

6. The combination with a wheeled frame, of a vertically movable shaft carrying a cutter, a vertically slidable rack, a pinion having its periphery provided with a toothed portion and a blank or untoothed portion, means for operating the pinion so that said rack will be raised when engaged by the toothed portion thereof and thereby impart a lifting tension upon said shaft, and means causing said shaft to resist movement until the untoothed portion of said pinion reaches a predetermined position with respect to said rack.

7. The combination with a wheeled frame of a pinion having its periphery provided with a toothed portion and a blank or untoothed portion, a vertically movable shaft carrying a cutter, a vertically slidable rack member provided with means yieldably engaging said shaft, means operated by the raising of said member for imparting a lifting tension to said shaft when said lifting member is raised, means for operating said pinion so that said rack will be raised when engaged by the toothed portion of the pinion and a lifting tension will be imparted upon said shaft, and means for causing the shaft to resist said lifting tension until the untoothed portion of the pinion reaches a predetermined position with respect to said rack.

8. The combination with a wheeled frame, of a vertically movable shaft carrying a cutter, a vertically slidable rack, a pinion having its periphery provided with a toothed portion and a blank or untoothed portion, means for operating the pinion so that said rack will be raised when engaged by said toothed portion, means preventing upward movement of the shaft while the teeth of said pinion are engaged with said rack, and means synchronized with said pinion for releasing said shaft when the smooth portion of the pinion reaches a predetermined position with respect to said rack.

In testimony whereof I have hereunto set my hand this 25th day of September, 1924.

COSTAS J. MAHERAS.